US012214372B2

(12) United States Patent
Lutz et al.

(10) Patent No.: US 12,214,372 B2
(45) Date of Patent: Feb. 4, 2025

(54) DEVICE FOR REMOVING HOT-MELT ADHESIVE

(71) Applicant: HOMAG GmbH, Schopfloch (DE)

(72) Inventors: Max Lutz, Fulda (DE); Johannes Schmid, Starzach (DE); Andreas Janott, Dörentrup (DE); Lars Weimer, Simmersfeld (DE); Evelyn Killinger, Freudenstadt (DE)

(73) Assignee: HOMAG GmbH, Schopfloch (DE)

( * ) Notice: Subject to any disclaimer, the term of this patent is extended or adjusted under 35 U.S.C. 154(b) by 681 days.

(21) Appl. No.: 17/439,386

(22) PCT Filed: Mar. 13, 2020

(86) PCT No.: PCT/EP2020/056898
§ 371 (c)(1),
(2) Date: Sep. 14, 2021

(87) PCT Pub. No.: WO2020/187756
PCT Pub. Date: Sep. 24, 2020

(65) Prior Publication Data

US 2022/0212224 A1 Jul. 7, 2022

(30) Foreign Application Priority Data

Mar. 15, 2019 (DE) ..................... 10 2019 106 642.5

(51) Int. Cl.
*B05C 1/08* (2006.01)
*B05C 1/00* (2006.01)
(Continued)

(52) U.S. Cl.
CPC ............ *B05C 1/0817* (2013.01); *B05C 1/006* (2013.01); *B05C 11/1039* (2013.01);
(Continued)

(58) Field of Classification Search
None
See application file for complete search history.

(56) References Cited

U.S. PATENT DOCUMENTS 3,749,054 A 7/1973 Brczinski
4,558,658 A * 12/1985 Sommer ................ B05C 11/04 118/411
(Continued)

FOREIGN PATENT DOCUMENTS

DE 1111562 B 7/1961
DE 2652133 C2 2/1982
(Continued)

*Primary Examiner* — Binu Thomas
(74) *Attorney, Agent, or Firm* — Morgan, Lewis & Bockius LLP

(57) ABSTRACT

A device for removing hot-melt adhesive from a rotating, vertically-arranged roller (1), comprising: a hollow, preferably hollow cylindrical, scraper (2), characterized in that the scraper (2) comprises an opening (6) on the circumferential surface thereof along the longitudinal axis, at which opening a strike plate (3) that protrudes radially outward is arranged, and wherein the strike plate (3) is arranged such that it can be brought into a position for removing adhesive from the roller (1) and can convey the removed adhesive towards the circumferential inner side of the scraper (2).

18 Claims, 2 Drawing Sheets

(51) Int. Cl.

| | |
|---|---|
| ***B05C 11/10*** | (2006.01) |
| ***B08B 1/16*** | (2024.01) |
| *B27D 5/00* | (2006.01) |
| *B65C 9/00* | (2006.01) |

(52) U.S. Cl.

CPC .............. *B08B 1/165* (2024.01); *B27D 5/003* (2013.01); *B65C 2009/0075* (2013.01)

(56) References Cited

U.S. PATENT DOCUMENTS

| | | | | | |
|---|---|---|---|---|---|
| 5,660,632 | A * | 8/1997 | Volpe, Jr. | B05C 11/044 | 118/406 |
| 6,299,732 | B1 * | 10/2001 | Rekila | B05C 11/04 | 15/256.51 |
| 6,361,655 | B1 * | 3/2002 | Holopainen | D21G 3/005 | 101/169 |
| 2008/0050563 | A1 * | 2/2008 | Bellmann | B05C 11/045 | 428/192 |
| 2009/0035037 | A1 | 2/2009 | Broch | | |
| 2011/0162804 | A1 * | 7/2011 | Secchi | B65C 9/2247 | 156/356 |
| 2016/0214151 | A1 | 7/2016 | Kramer et al. | | |
| 2017/0253768 | A1 * | 9/2017 | Kappeler | B05C 1/0813 | |

FOREIGN PATENT DOCUMENTS

| | | | | |
|---|---|---|---|---|
| DE | 4444779 | | 6/1996 | |
| DE | 69405690 | | 2/1998 | |
| DE | 102007025982 | | 12/2008 | |
| EP | 2610192 | A1 | 7/2013 | |
| EP | 3406409 | A1 * | 11/2018 | B05C 1/006 |

* cited by examiner

DEVICE FOR REMOVING HOT-MELT ADHESIVE

TECHNICAL FIELD

The present invention relates to a device for removing hot-melt adhesive from a rotating, vertically-arranged roller, in particular for use in a roller application system for processing hot-melt adhesives in edge banding machines.

PRIOR ART

Roller application systems are generally used in edge banding machines for processing hot-melt adhesives. This means that these types of systems transfer heated, viscous adhesive of different types and chemical configurations to wood-like workpieces or workpieces consisting at least partially of wood. For example, these types of roller application systems can be used to enable automatic and quick attachment of plastic or wooden edges to a workpiece.

When changing the adhesive from the typically used ethylene vinyl acetate or polyolefin adhesives to, for example, polyurethane, the roller application system must be emptied and cleaned since mixing of the adhesives is counterproductive and undesirable due to the different chemical properties as well as different temperatures. A comparable cleaning and emptying step in a roller application system is also necessary when changing the color of the adhesive.

During a cleaning and/or changing process, the roller application system was, until now, removed from the edge banding machine and emptied and cleaned of the remaining adhesive next to the system by an operator. However, this process is laborious and time-consuming. Furthermore, hot-melt adhesive residues can remain on the roller of the roller application system, with which the hot melt adhesive is applied to the workpieces.

Another laborious solution for emptying and cleaning a roller of hot-melt adhesive of a specific type is to scrape off the adhesive via a slider integrated on a collection tray. However, such a configuration cannot prevent an uneven distribution of adhesive in the collection tray, such that an operator has to even it out with the aid of a tool. An uneven distribution of the adhesive in the collection tray can furthermore cause the adhesive to overflow the collection tray, which may lead to contamination and stickiness of the edge banding machine.

Another hitherto known solution for the automatic emptying and cleaning of roller application systems of edge banding machines merely consists of downwardly discharging the remaining adhesive in a vertical roller arrangement. However, this is highly disadvantageous since there is usually little installation space in current machines with roller application systems, especially in the lower area of the machine, and removal of the excess and removed adhesive is thus typically complicated and laborious. In the event of irregularities or excess hot-melt adhesive, the entire roller application system might have to be removed using necessary additional tools in order to prevent further contamination of the edge banding machine. Such a process of discharging the hot-melt adhesive is furthermore very time-consuming.

DESCRIPTION OF THE INVENTION

The object of the present invention is thus to provide a device for removing hot-melt adhesive from a rotating, vertically-arranged roller, which enables fast, simple and complete removal of hot-melt adhesive from a roller—for example in a roller application system of an edge banding machine—without requiring additional tools or additional conveying systems.

This object is solved by a device having the features of claim 1. Preferred embodiments can be found in the further claims, in the following description and in the drawings.

According to the invention, the device for removing hot-melt adhesive from a rotating, vertically-arranged roller comprises a hollow scraper.

The term "hollow" is to be understood to generally mean a hollowed-out object having a hollow inside, without edges in the basic shape. An elliptical or oval body is preferably meant here. A hollow cylindrical scraper is particularly preferred.

The scraper is furthermore characterized in that it comprises an opening on the circumferential surface thereof along the longitudinal axis, at which opening a strike plate that protrudes radially outward is arranged, and the strike plate is arranged such that it can be brought into a position for removing adhesive from the roller and can convey the removed adhesive towards the circumferential inner side of the scraper.

The "opening" is thus to be understood as a slit or continuous cut-out in the surface of the scraper so that the removed adhesive, which can be removed from the roller by means of the strike plate during removal/cleaning of the roller, can be conveyed into the inside of the scraper.

According to such a configuration, it is possible for adhesive that has been removed from the roller to be conveyed into the circumferential inner side of the scraper owing to the configuration thereof, and for it to be removed and conveyed away by means of dynamic pressure, which is increased in the inside of the scraper owing to a continuous feed of viscous adhesive material.

In other words, the invention is thus based on the basic idea of rapidly, easily and steadily conveying, against gravity (i.e. in the vertical direction), the removed hot-melt adhesive away from the roller of a roller application system of an edge banding machine, for example, by means of the dynamic pressure generated inside the scraper and the resulting hot-melt adhesive vortex on the circumferential inner side of the scraper.

This means that a constant and steady removal process can be achieved owing to the configuration of the device, and that, by means of the scraper, the dynamic pressure inside the scraper is kept constant and a vortex is created on the circumferential inner side owing to the achieved constant feeding of adhesive such that the removed hot-melt adhesive material can be conveyed away in the scraper against dynamic pressure and gravity. Since this takes place against gravity and therefore does not have to take place at the lower side of a machine in the vertical direction, a better accessibility for emptying the removed material is hereby ensured. Owing to the configuration of the scraper with an opening and a strike plate connected thereto, it is moreover possible to remove the hot-melt adhesive material without requiring additional tools or further devices. In addition, no electricity or cabling is necessary since the hot-melt adhesive can be conveyed away from the roller, against gravity, owing to the structural configuration of the device alone, in particular owing to the flow created thereby in the form of a vortex on the inner wall.

According to a further development of the invention, the scraper comprises a base element, the scraper being arranged such that it starts from the base element. This results in a particularly effective conveyance of the removed adhesive.

According to a further aspect, the opening of the scraper extends across the entire length thereof.

According to such a configuration, it is possible to prevent side streams or misdirected hot-melt adhesive streams within a roller application system, for example. In other words, it can thus be ensured that the removed hot-melt adhesive can be fully conveyed into the inside of the scraper, where it can be transported upwards against gravity by means of the aforedescribed dynamic pressure and the vortex resulting therefrom. Misdirected removed hot-melt adhesive flows can thus be prevented within the roller application system.

According to a further aspect, the engagement angle between the roller and the strike plate for removing the adhesive towards the inside of the scraper is an acute angle. This angle is, for example, preferably less than 75°, particularly preferably less than 50°, and even more preferably less than 30°.

In this context, the "engagement angle" between the roller and the strike plate is to be understood as the angle resulting from a tangent at the engagement point between the strike plate and the roller, more specifically between the adhesive layer on the roller and the strike plate itself in the direction of said tangent to the roller.

According to such a configuration with an acute engagement angle, it is possible to achieve a low diversion of the adhesive. This thus ensures that the adhesive flow can be guided in a continuous and concentrated manner without irregularities occurring. In addition, easy removal of the hot-melt adhesive from the roller can be ensured owing to the acute angle between the two components that will be engaged during removal.

According to a further aspect, an outlet is arranged in the upper half along the longitudinal axis of the scraper, preferably at the vertical upper end of said scraper.

According to such a configuration, it is possible to convey the hot-melt adhesive, which is conveyed upwards against gravity by the vortex on the inner wall of the scraper, towards the outside in a controlled manner. This means that, when the roller is rotating, the scraper takes the adhesive from the roller and, in the case of the vertically-arranged roller, conveys said adhesive in its inside along the inner wall of the scraper upwards to the upper edge of the scraper. The emptying process can subsequently occur fully automatically through the outlet. This means that the outlet, which is particularly preferably arranged at the vertical upper end of the scraper, ensures that the hot-melt adhesive emerging from the scraper can be safely transported away without additional conveying devices or the like being necessary therefor. It is thus ensured that no component has to be removed from the machine in advance when changing the adhesive or when cleaning the (applicator) roller, and that a simple device is merely required therefor.

According to a further aspect, the outlet is connected to a heat-resistant collection tray.

According to such a configuration, it is possible for the hot-melt adhesive to be conveyed away from the roller (of the roller application system of an edge banding machine, for example). This means that the hot-melt adhesive can be removed from the roller within a few minutes, and the roller can thus either be emptied or a change of adhesive can be carried out. The excess hot-melt adhesive can furthermore be automatically collected in the heat-resistant collection tray. It is thus possible to increase productivity and reduce maintenance work or cleaning steps for cleaning the roller or for changing the hot-melt adhesive. The heat-resistant collection tray itself can be easily removed from the device. In this regard, it is preferred that the heat-resistant collection tray is configured in a reversible manner. That is to say, the heat-resistant collection tray with the hot-melt adhesive contained therein can be removed from the device for removing hot-melt adhesive, and can be re-used following cleaning of the heat-resistant collection tray.

According to a further aspect, the device for removing hot-melt adhesive is manufactured by injection molding, at least in sections.

According to such a configuration, it is possible to reduce the costs of such a device and to configure the whole device as a disposable product. That is to say, the device can be easily removed and completely disposed of following removal of the hot-melt adhesive from the vertically-arranged roller.

According to a further aspect, at least the surface of the strike plate and/or the circumferential inner side of the scraper may comprise an adhesion-reducing material.

According to such a configuration, it is possible for removal of the hot-melt adhesive to occur in a manner with particularly low friction, and for the hot-melt adhesive to be conveyed to the inside of the scraper particularly easily. Owing to the vortex occurring on the inner surface, the hot-melt adhesive to be removed can then be conveyed away from the roller with low friction and can be conveyed upwards, out of the scraper, against gravity.

It is consequently also possible for the device for removing hot-melt adhesive to be configured so as to be re-usable.

An example of this type of adhesion-reducing material is the configuration with Teflon-coated aluminum. Simple non-stick surface treatments of aluminum or other materials can also be used therefor.

According to a further aspect of the present disclosure, a roller application system for applying hot-melt adhesive to a workpiece, which preferably consists at least in sections of wood, wood materials, plastic or the like, can be configured with a device for removing hot-melt adhesive and with a roller for applying hot-melt adhesive to a workpiece.

In this regard, the scraper preferably extends at least across the entire length of the roller.

According to such a configuration, a particularly simple configuration of the device for removing hot-melt adhesive is possible. Furthermore, fixing of the device is greatly simplified since said device does not have to be moved for removal of the hot-melt adhesive but can rather be secured against shifting away from the roller, from which the adhesive is to be removed, by means of a simple pin.

The configuration of the scraper across the entire length of the roller moreover leads to the hot-melt adhesive being able to be removed and the roller being able to be cleaned particularly quickly, in particular within a few minutes.

Furthermore, no laborious preparation is necessary therefor since the device for removing hot-melt adhesive functions in a purely mechanical way, and no controls or the like have to be activated. Easy, complete and fast removal of hot-melt adhesive from a rotating, vertically-arranged roller can thus be ensured.

According to a further aspect of the disclosure, an edge banding machine may comprise, in addition to the roller application system that has just been described, an edge feeding device which is configured such that plastic or wooden edges can be fed, at a speed identical to a workpiece conveying speed, to a workpiece that preferably consists at least in sections of wood, wood materials or the like.

BRIEF DESCRIPTION OF THE DRAWINGS

In the following, a device for removing hot-melt adhesive from a rotating, vertically-arranged roller is shown by means of schematic drawings. Devices of this type are used, for example, in edge banding machines or, in general, in roller application systems for processing hot-melt adhesives. The drawings show the following.

DESCRIPTION OF THE PREFERRED EMBODIMENTS

Figure 1:
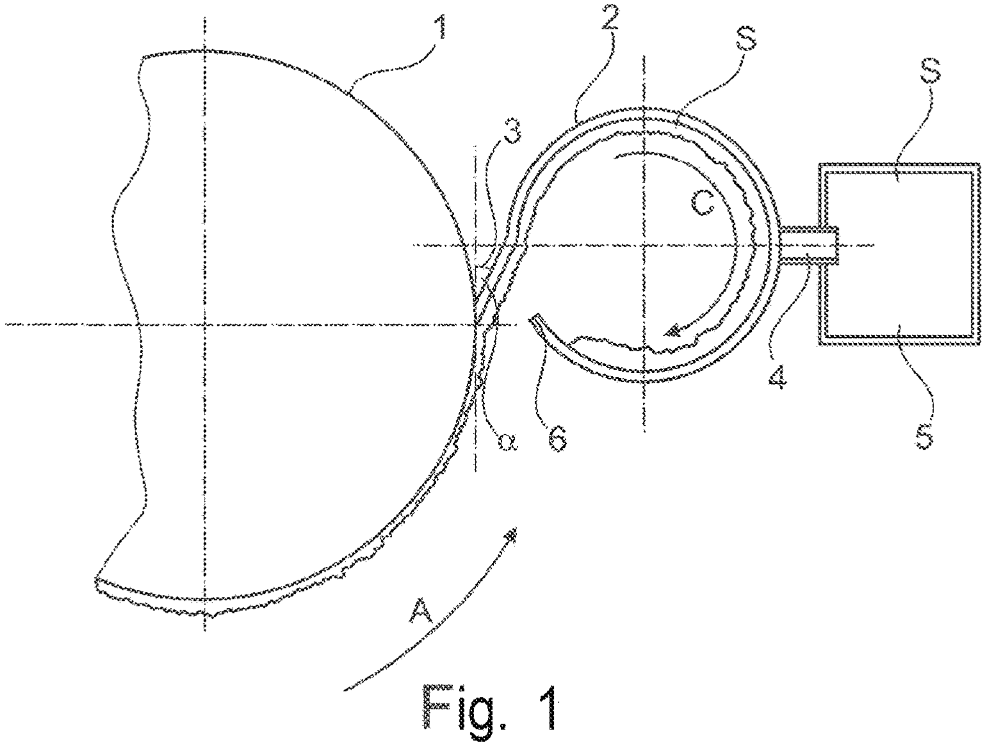
FIG. 1: A schematic plan view of a device for removing hot-melt adhesive from a rotating, vertically-arranged roller, according to one embodiment example.
Figure 3:
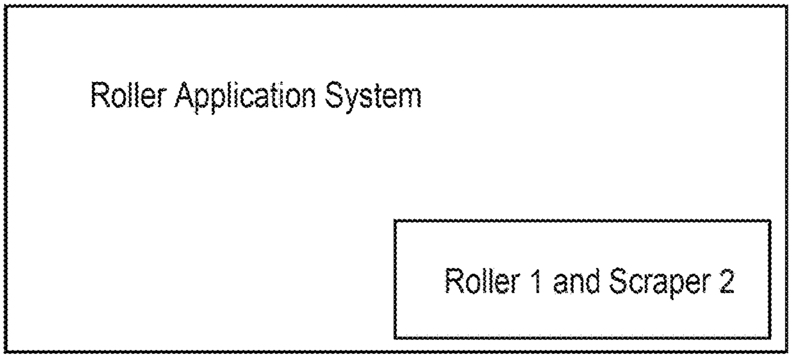
FIG. 3: A schematic view of a roller application system that includes a device for removing hot-melt adhesive, according to some embodiments.

FIG. 1 of the present application shows a plan view of a device for removing hot-melt adhesive from a rotating, vertically-arranged roller. In particular, it is clearly apparent in the plan view that a roller 1 engages with a cylindrical scraper 2 of the device in order to remove hot-melt adhesive from the roller 1. In this regard, it is apparent in the plan view of the device that the surface of the roller 1, which rotates in the direction A, is coated with the hot-melt adhesive. This roller is arranged, for example, in a roller application system (as shown generally in FIG. 3) for processing hot-melt adhesives, and serves, for example, to apply various types of heated viscose adhesive to wood-like workpieces or workpieces consisting at least in sections of wood during normal operation. An example use herefor is an edge banding machine, in which adhesive is applied next to a workpiece guided in parallel, and a plastic or wooden edge is connected to the workpiece.

The device for removing hot-melt adhesive from such a rotating roller, shown in FIG. 1, generally fulfills two functions or, to be more precise, has two fields of application. A first field of application relates to the complete cleaning of the application roller in the application system. A second field of application relates to the use when changing the adhesive on the roller. This means that the remaining adhesive on the roller can be safely and reliably removed by the device for removing hot-melt adhesive in each of the fields of application. To ensure this, a rotating, vertically-arranged roller 1 comes into contact with the cylindrical scraper 2 of the device in the embodiment example shown in FIG. 1 of the device for removing hot-melt adhesive.

The contact between the roller 1 and the cylindrical scraper 2 in particular occurs via a strike plate 3 arranged on the cylindrical scraper 2. As is clearly apparent from FIG. 1, the adhesive on the outer circumferential surface of the roller 1 is removed from the roller surface by the strike plate 3, which is arranged at an acute angle α relative to the roller surface. In other words, the strike plate 3, which is arranged at an acute angle relative to the roller surface, comes into contact with the roller surface of the roller 1 and thus breaks the adhesion of the hot-melt adhesive to the surface of the roller 1.

Figure 2:
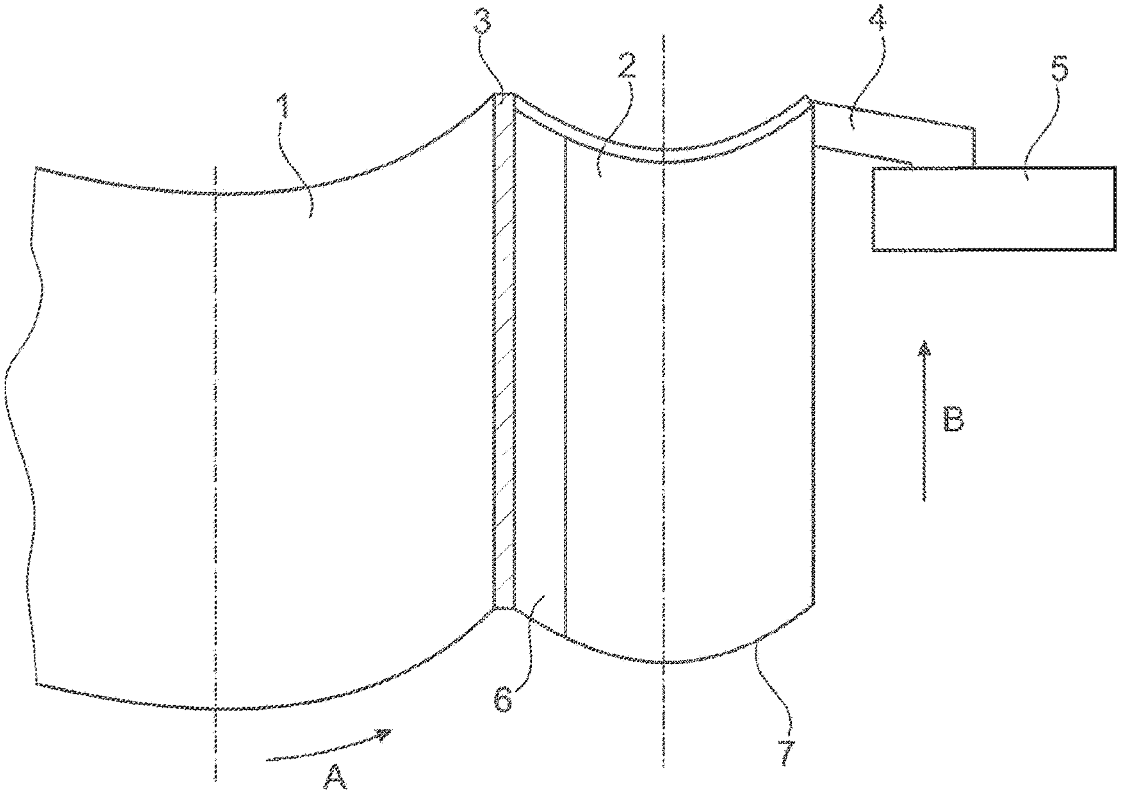
FIG. 2: A schematic side view of the device for removing hot-melt adhesive from a rotating, vertically-arranged roller.

In this regard, it is clearly apparent from FIG. 2 that the strike plate 3 is formed across the entire length of the roller 1 in the preferred embodiment. The cylindrical scraper 2 for removing the hot-melt adhesive thus does not have to be moved, and the hot-melt adhesive is removed across the entire longitudinal axis of the roller in one step by rotation of the roller. The scraper 2 is furthermore closed by a base element 7 at the lower end thereof in the longitudinal direction.

It is also revealed by FIG. 2 of the present application that an outlet 4 is arranged at the vertical upper end of the cylindrical scraper.

Said outlet 4 is for transporting excess hot-melt adhesive out of the cylindrical scraper 2. The outlet 4 shown in the embodiment example is furthermore connected to a collection tray 5. In this regard, it is preferred that the collection tray 5 is heat-resistant.

The mode of operation of the device for removing hot-melt adhesive from a rotating, vertically-arranged roller will now be explained below.

Figure 4:
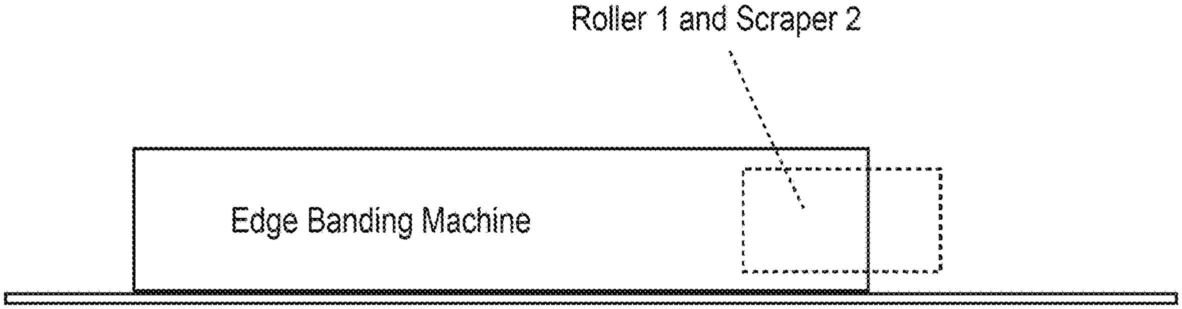
FIG. 4: A schematic view of an edge banding machine having a device for removing hot-melt adhesive, according to some embodiments.

During normal operation of the roller 1, for example in an edge banding machine, the device for removing hot-melt adhesive is spaced apart from the rotating, vertically-arranged roller 1. This arrangement is shown generally in FIG. 4.

However, if the roller 1 is cleaned and emptied in order to carry out a change of adhesive, for example, the device for removing hot-melt adhesive on the rotating, vertically-arranged roller 1 is used. The device is positioned on the roller 1 in such a manner that the strike plate 3 comes into contact with the outer circumferential surface of the roller 1. The position of the device for removing hot-melt adhesive is ensured by a simple pin on the roller, for example.

In this regard, it is preferred that the surface of the roller 1 and the strike plate 3 contact one another at engagement angle α. It is particularly preferred that an acute angle is formed between a tangent running along the contact line between the roller 1 and the strike plate 3 and the strike plate 3 itself. Owing to contact of the strike plate 3 with the surface of the roller 1, the conveying direction of the hot-melt adhesive can thus be manipulated over the surface of the strike plate (see FIG. 1).

In the next step, the strike plate 3 can remove the hot-melt adhesive from the roller 1 when the roller is rotating, and can convey said adhesive into the inside of the cylindrical scraper 2, in a direction opposite to the direction of rotation A of the roller 1.

The dynamic pressure within the cylinder of the scraper 2 increases as more and more adhesive is conveyed into the inside of the cylinder of the scraper 2 through the opening 6 of said cylindrical scraper 2.

By conveying the hot-melt adhesive in a direction opposite to the direction of rotation of the roller 1 (direction C), it is thus possible, as the roller 1 continues to rotate, to convey the removed hot-melt adhesive upwards in a vertical direction by means of the device, against dynamic pressure and gravity (see arrow B in FIG. 2).

Owing to the resulting vortex in the inside of the cylinder of the scraper 2, the removed hot-melt adhesive can be conveyed upwards in a simple and easy manner against gravity, without additional conveying devices being required.

In a final step, the removed hot-melt adhesive material is collected, via an outlet 4, in the heat-resistant collection tray 5 at the upper vertical end of the cylindrical scraper 2.

After the roller 1 has been cleaned, the device for removing hot-melt adhesive according to the embodiment example may be completely detached from the roller 1 and may remain in the roller application system, spaced apart from the roller 1. The removed hot-melt adhesive can be removed from the collection tray 5 that is arranged on the upper side of the cylindrical scraper 2 and can be disposed of.

In a further embodiment example that is not shown, the device for removing hot-melt adhesive can also consist of a plurality of sequential scrapers 2, which are proportionally distributed along the entire length of the roller.

According to such a configuration, it is thus possible to simultaneously remove hot-melt adhesive over the entire length of the roller by means of a plurality of individual components. The diameter of the scraper can thus be reduced and the hot-melt adhesive can be removed at several points simultaneously. The time required until sufficient dynamic pressure has been created within the scraper to generate a vortex can thus be reduced, and the removal of the hot-melt adhesive can be further accelerated, or, to be more precise, the time for removal can be reduced.

LIST OF REFERENCE NUMBERS

1 Roller
2 Scraper
3 Strike plate
4 Outlet
5 Collection tray
6 Opening
7 Base element
A Direction of rotation of the roller
C Direction of rotation of the adhesive within the scraper (vertical)
A Engagement angle between the roller and the strike plate

The invention claimed is:

1. A device for removing hot-melt adhesive from a rotating, vertically arranged roller, comprising:
a hollow scraper;
wherein the scraper comprises an opening on a circumferential surface thereof along a longitudinal axis, at which opening a strike plate that protrudes radially outward is arranged, and an outlet is arranged in an upper half along the longitudinal axis of the scraper, and
wherein the strike plate is configured to be brought into a position for removing adhesive from the roller and to convey the removed adhesive towards the circumferential surface of the scraper.

2. A device for removing hot-melt adhesive according to claim 1, wherein the scraper comprises a base element, the scraper being arranged such that it starts from the base element.

3. A device for removing hot-melt adhesive according to claim 1, wherein the opening extends across an entire length of the scraper.

4. A device for removing hot-melt adhesive according to claim 1, wherein the strike plate is arranged such that an engagement angle (a) between the roller and the strike plate for removing the hot-melt adhesive towards an interior of the scraper is an acute angle.

5. A device for removing hot-melt adhesive according to claim 1, wherein the device is configured to convey away the hot-melt adhesive by dynamic pressure.

6. A device for removing hot-melt adhesive according to claim 1, wherein the outlet is arranged a vertical upper end of the scraper.

7. A device for removing hot-melt adhesive according to claim 6, wherein the outlet is connected to a heat-resistant collection tray.

8. A device for removing hot-melt adhesive according to claim 1, wherein at least the surface of the strike plate or the circumferential surface of the scraper comprises an adhesion-reducing material.

9. A roller application system for applying hot-melt adhesive to a workpiece, comprising a device for removing hot-melt adhesive according to claim 1 and comprising a roller for applying hot-melt adhesive.

10. A roller application system according to claim 9, wherein the scraper extends at least across an entire length of the roller.

11. An edge banding machine, comprising:
a roller application system according to claim 9, and
an edge feeding device which is configured to feed plastic or wooden edges, at a speed identical to a workpiece conveying speed, to a workpiece.

12. A device for removing hot-melt adhesive according to claim 1, wherein the scraper comprises a cylindrical shape.

13. A device for removing hot-melt adhesive according to claim 4, wherein the acute angle is less than 75°.

14. A device for removing hot-melt adhesive according to claim 4, wherein the acute angle is less than 50°.

15. A device for removing hot-melt adhesive according to claim 4, wherein the acute angle is less than 30°.

16. A device for removing hot-melt adhesive according to claim 5, wherein the device is configured such that the hot-melt adhesive is conveyed away in a vertical direction against gravity.

17. A roller application system according to claim 9, wherein the workpiece comprises wood, wood material, or plastic-material.

18. An edge banding machine according to claim 11, wherein the workpiece comprises wood, wood material, or plastic material.

* * * * *